United States Patent
Naehring et al.

(10) Patent No.: US 7,022,007 B2
(45) Date of Patent: Apr. 4, 2006

(54) PROCESS FOR MAKING A BONELESS PORK BACK RIB PRODUCT

(75) Inventors: Gerald J. Naehring, 270 Northland Blvd. Suite 101, Cincinnati, OH (US) 45246; Omal C. Maitra, Minneapolis, MN (US)

(73) Assignee: Gerald J. Naehring, Cincinnati, OH (US)

( * ) Notice: Subject to any disclaimer, the term of this patent is extended or adjusted under 35 U.S.C. 154(b) by 0 days.

(21) Appl. No.: 11/009,905

(22) Filed: Dec. 10, 2004

(65) Prior Publication Data

US 2005/0136818 A1 Jun. 23, 2005

Related U.S. Application Data

(60) Provisional application No. 60/531,814, filed on Dec. 22, 2003.

(51) Int. Cl.
*A22C 18/00* (2006.01)
(52) U.S. Cl. ............................................. 452/156
(58) Field of Classification Search ................ 452/149, 452/155, 156, 174, 141
See application file for complete search history.

(56) References Cited

U.S. PATENT DOCUMENTS

| | | | | |
|---|---|---|---|---|
| 3,940,998 A | * | 3/1976 | Sourby et al. | 73/865 |
| 4,072,763 A | * | 2/1978 | Mart | 426/513 |
| 6,040,013 A | * | 3/2000 | Karales | 427/281 |
| 2002/0127963 A1 | * | 9/2002 | Mickelsen | 452/149 |
| 2004/0241296 A1 | * | 12/2004 | Roth | 426/331 |
| 2005/0112271 A1 | * | 5/2005 | Pickarski | 426/656 |

OTHER PUBLICATIONS

Advertisement entitled "BBQ Pork Steak Rib-Shape" by Maid-Rite Steak Company, Inc., Dunmore, PA, 1997; (2 pages).

*The Meat Buyers Guide*, North American Meat Processors Association, Reston, VA, 1997;(8 pages, including cover, title page, and pages bearing meat cut Nos. 410,411, 412, 412A, 412B, 412C, 412D, 412E, 413, 413A, 413B, 414, 415, 415A, 417 and 417A).

* cited by examiner

*Primary Examiner*—Thomas Price
(74) *Attorney, Agent, or Firm*—Kinney & Lange, P.A.

(57) ABSTRACT

The present invention is a method for cutting pork to create a meat cut that mimics a slab of pork rib meat. The method involves injecting a center cut boneless pork loin with a seasoning solution and tumbling the boneless pork loin. The method then includes sealing the boneless pork loin within a hermetic enclosure and chilling the enclosed boneless pork loin to a temperature less than 25 degrees Fahrenheit. The method then further includes removing the chilled boneless pork loin from the enclosure and forming the chilled boneless pork loin into a desired shape. Finally, the method includes cutting the chilled and formed boneless pork loin into a thickness and a length to mimic a slab of pork rib meat to create a boneless loin back rib. The meat cut can be sold as a raw cut or as a pre-cooked cut that is vacuumed packed either dry or with a marinade. The resulting meat cut includes, no bones, only the Longissimus muscle and the Spinalis muscle, and is not made from restructured pork.

18 Claims, 3 Drawing Sheets

PROCESS FOR MAKING A BONELESS PORK BACK RIB PRODUCT

CROSS-REFERENCE TO RELATED APPLICATION(S)

This application claims priority from U.S. Provisional Patent Application Ser. No. 60/531,814 filed on Dec. 22, 2003, for "Process for Boneless Baby Loin Back Ribs" by Gerald J. Naehring and Omal C. Maitra.

BACKGROUND OF THE INVENTION

The present invention generally relates to a method for forming a meat cut from a center cut boneless pork loin. In particular, the present invention relates to a method for forming a boneless meat cut to create a final meat product that mimics a pork rib meat which includes no bones and includes only the Longissimus muscle (meat) and the Spinalis muscle (meat).

In recent years, individuals have become increasingly interested in food products that are economical and attractive. Additionally, there has been a increase in the demand for more "finger food" products such as ribs as well as a rise in popularity of barbeque ribs—both in restaurant and home cooking. There exist in the art methods to produce pork loin back ribs. Such examples produce a meat product that includes both bones and meat or a product made from restructured pork. A meat cut that includes both bones and meat makes it more difficult for a person to consume all available meat because the person must work around and between the bones. In addition, there exists in the art examples of methods for forming a meat cut from a center cut boneless pork loin. Such examples disclose a method that results in a boneless pork loin roast or a pork chop.

The present invention discloses a more efficient use of available meat on the pig carcass. Also, the present invention discloses how to convert a pork meat cut to a more attractive and economically beneficial meat cut to achieve an end product that is more in demand. Thus, the present invention provides a method for forming a meat cut that will produce a meaty and easy to consume boneless loin back rib.

BRIEF SUMMARY OF THE INVENTION

The present invention is a process or method for forming a meat cut from a center cut boneless pork loin which includes only the Longissimus muscle (meat) and the Spinalis muscle (meat). The method involves first injecting the boneless pork loin with a seasoning solution and tumbling the boneless pork loin. The method then includes sealing the boneless pork loin within a hermetic enclosure and chilling the enclosed boneless pork loin to a temperature less than 25 degrees Fahrenheit. The method then further includes removing the chilled boneless pork loin from the enclosure and forming the chilled boneless pork loin into a desired shape. Finally, the method includes cutting the chilled and formed boneless pork loin into a thickness and a length to mimic a slab of pork rib meat.

BRIEF DESCRIPTION OF THE DRAWINGS

The present invention will be further explained with reference to the drawing figures referenced below, wherein like structure is referred to by like numerals throughout the several views.

While the above-identified figures set forth one embodiment of the invention, other embodiments of the present invention are also contemplated, as noted in the discussion. In all cases, this disclosure presents illustrative embodiments of the present invention by way of representation and not limitation. It should be understood that numerous other modifications and embodiments can be devised by those skilled in the art, which fall within the scope and spirit of the principles of this invention.

DETAILED DESCRIPTION

The present invention provides a method for forming a meat cut that will produce a meaty and easy to consume boneless loin back rib. More specifically, the present invention is a method for cutting a center cut boneless pork loin to create an edible boneless loin back rib that mimics a slab of pork rib meat (i.e., a pork loin boneless back rib). In a butchered pig, the pork loin back rib generally consists of the rib bones as well as the associated muscles, or is made from restructured pork. The present invention discloses a method for cutting a pork loin to create a boneless loin back rib that mimics a slab of pork rib meat and includes only the associated muscles and is not made from restructured pork.

Figure 1:
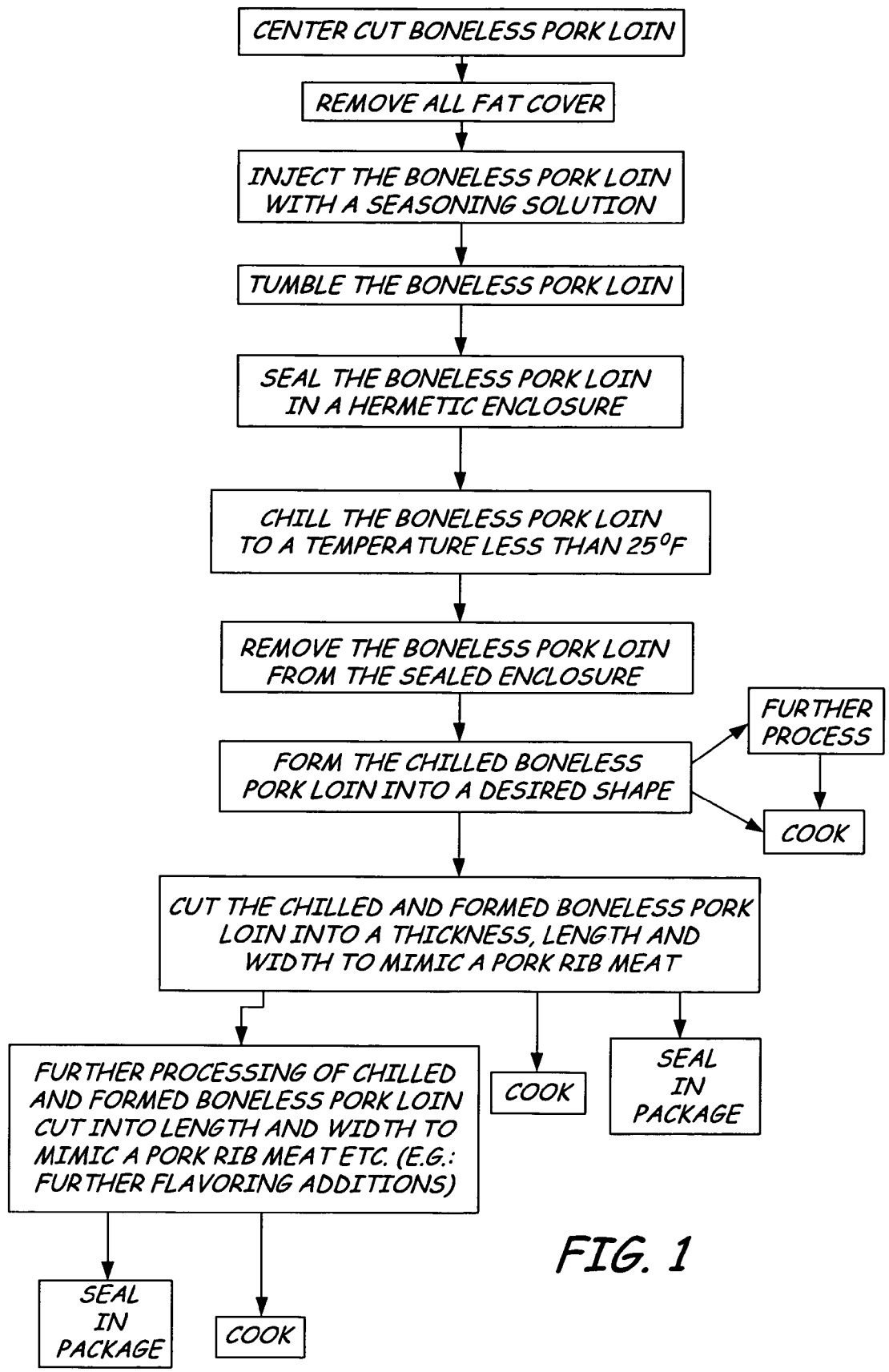
FIG. 1 is a block diagram illustrating the inventive method of forming a meat cut from a center cut boneless pork loin.

FIG. 1 shows, in a block diagram, one form of the steps involved in the inventive method of forming a meat cut from a center cut boneless pork loin.

Figure 2:
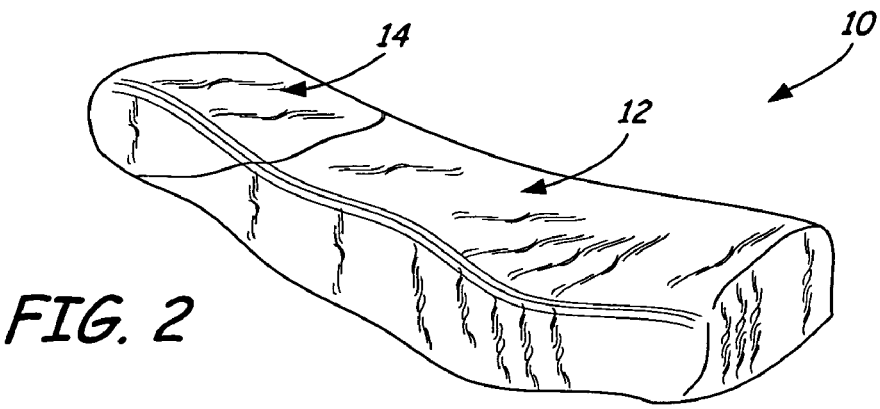
FIG. 2 is a perspective view of a center cut boneless pork loin.

FIG. 2 shows a center cut boneless pork loin 10 that includes only a Longissimus muscle 12 and a Spinalis muscle 14. The method first involves obtaining from a pork carcass a center cut boneless pork loin 10 that includes only the Longissimus muscle 12 and the Spinalis muscle 14. To obtain a center cut boneless pork loin 10, first the tenderloin, the sirloin end and the rib end (in that order) are removed from a pork loin. Then the backbone is split from the back ribs so that the backbone can be removed from the pork loin. Finally, the pork loin is separated from the back ribs creating the center cut boneless pork loin 10. This method of obtaining a center cut boneless pork loin 10 is known. However, in practicing the present invention, once the center cut boneless pork loin 10 is obtained, the fat cover is removed so that the Longissimus muscle 12 and the Spinalis muscle 14 are exposed.

Next, the center cut boneless pork loin 10 is injected with a seasoning solution and tumbled. The seasoning solution contains phosphates, lactates, spices and flavorings. The seasoning solution ingredients may vary depending upon the desired flavor. The amount of seasoning solution injected into the boneless pork loin 10 increases the weight of the boneless pork loin 10 by 10% to 40%. Once the boneless pork loin 10 is injected with the desired seasoning solution, the boneless pork loin 10 is then tumbled. The process of tumbling is a mechanical process of extracting proteins that is known. The boneless pork loin 10 is injected with the seasoning solution and then tumbled in order to compensate for the loss of moisture if the boneless pork loin 10 is overcooked. The Longissimus muscle 12 is a very lean muscle and, therefore, if the Longissimus muscle 12 is overcooked, it becomes very dry (and thus less desirable as a prepared meat product). Thus, injecting the seasoning solution and tumbling the boneless pork loin 10 allows the final product to attain a desirable flavor and moisture level (i.e., a final meat product with enhanced tenderness).

Next, the boneless pork loin 10 is sealed in a hermetic enclosure. Sealing the boneless pork loin 10 protects the boneless pork loin 10 from freezer burn, provides for a longer shelf life and maintains the moisture level in the boneless pork loin 10. A plastic sheet or plastic bag or any other suitable packaging (such as a vacuum package) may be used to wrap the boneless pork loin 10 as long as it provides a hermetic enclosure.

Figure 3:
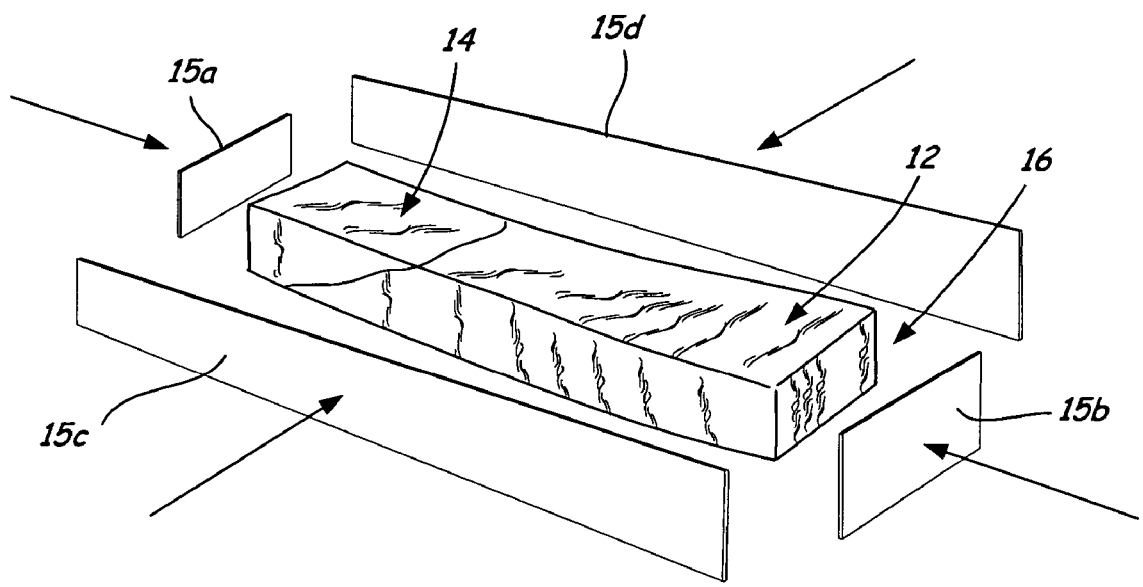
FIG. 3 is a perspective view of a formed boneless pork loin.

The sealed boneless pork loin 10 is then chilled to a temperature less than 25 degrees Fahrenheit and is held at that temperature. In one embodiment, the sealed boneless pork loin is chilled to a temperature of 20 degrees Fahrenheit. Chilling the boneless pork loin 10 to a temperature less than 25 degrees Fahrenheit gives the Longissimus muscle 12 and the Spinalis muscle 14 rigidity in order to later shape the boneless pork loin 10 during the process of the present invention. The chilled boneless pork loin 10 is then removed from within the hermetic enclosure and placed into a press machine to be formed into a desired shape. The press machine has moveable panels (e.g., end panels 15a and 15b, side panels 15c and 15d, and top and bottom panels (not shown)) that can be urged into contact with the chilled boneless pork loin to push it into a desired shape. FIG. 3 shows generally a rectangularly chilled and formed boneless pork loin 16 that is approximately four to five inches wide. Although a rectangle shape is shown, any shape or design can be formed such as a square D-shape. In addition, the press machine can have pressing panels that create rib-like impressions on at least one major side of the chilled and formed boneless pork loin 16. It is important that the formed boneless pork loin 16 be maintained at a temperature less than 25 degrees Fahrenheit, because as the temperature increases above 25 degrees Fahrenheit, the formed boneless pork loin 16 will otherwise lose its shape. Alternatively, the chilled and formed boneless pork loin 16 may be immediately cooked with or without further processing after forming, which will allow it to maintain its shape. Immediately cooking the formed boneless pork loin 16 gives the Longissimus muscle 12 and the Spinalis muscle 14 rigidity to maintain its shape.

Figure 4:
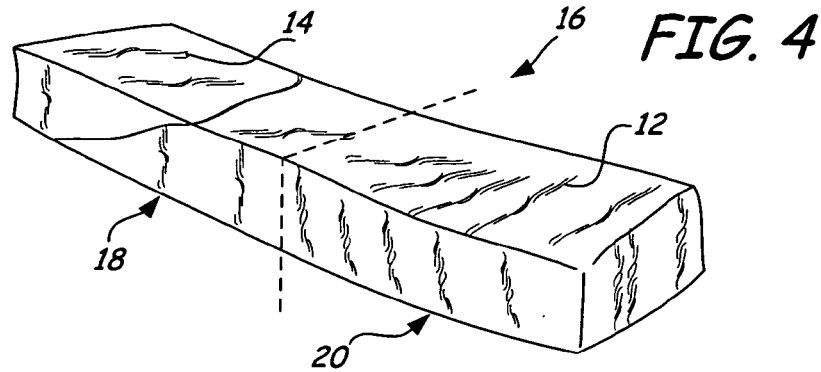
FIG. 4 is a perspective view of a formed boneless pork loin being cut in half to produce 11 to 13 inch length forms of boneless pork loin.

If not immediately cooked or otherwise further processed, the chilled and formed boneless pork loin 16 is cut into a thickness and a length to mimic a slab of pork rib meat. FIG. 4 shows that the formed boneless pork loin 16 is cut in half to produce two about 11 inches to about 13 inches length forms of boneless pork loin 18 and 20. Form 18 includes both the Longissimus muscle 12 and the Spinalis muscle 14. Form 20 only includes the Longissimus muscle 12.

Figure 5:
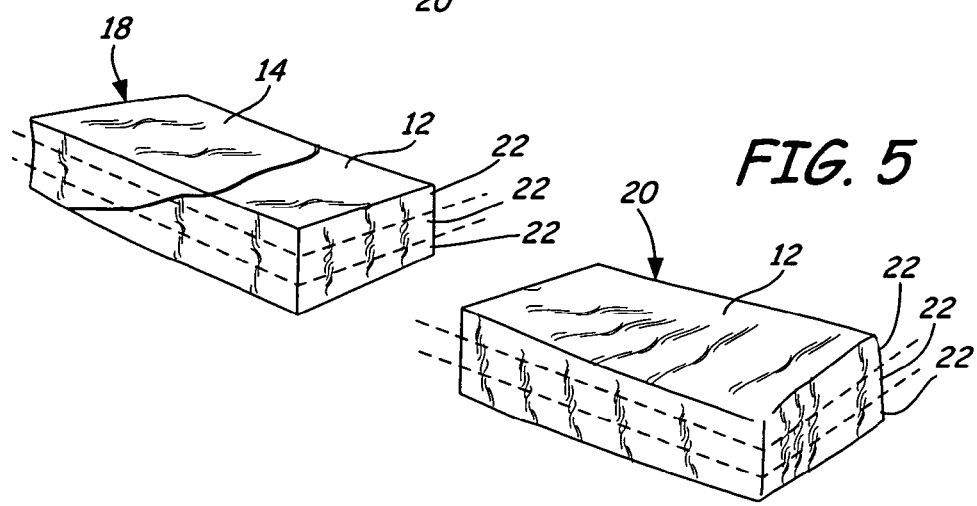
FIG. 5 is a perspective view of 11 to 13 inch length forms of boneless pork loin being cut lengthwise to produce ½ to ¾ inch thick boneless pork loin.

FIG. 5 shows that the forms 18 and 20 are then cut lengthwise to produce about ½ inch to about ¾ inch thick forms of boneless pork loin 22. Each form 18 and 20 produces three forms of boneless pork loin 22. Form 18 produces forms of boneless pork loin 22 that include both the Longissimus muscle 12 and the Spinalis muscle 14. Form 20 produces forms of boneless pork loin 22 that only includes the Longissimus muscle 12.

Figure 6:
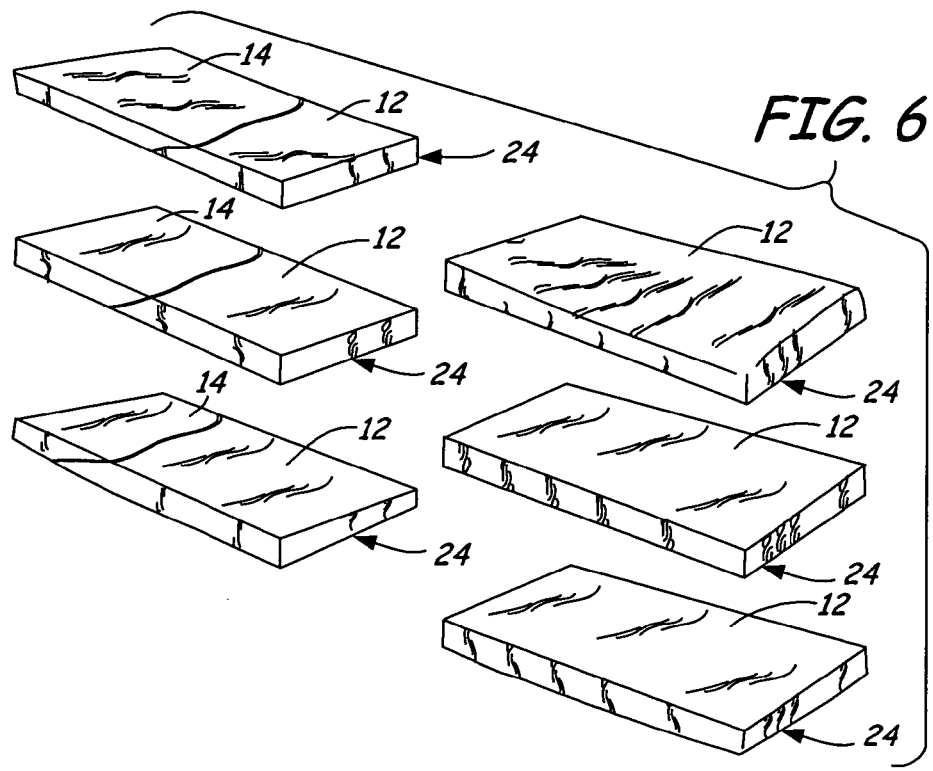
FIG. 6 is a perspective view of a completed edible meat cut that mimics a slab of pork rib meat showing the muscles (meat).

FIG. 6 shows a completed edible meat cut 24 that mimics a slab of pork rib meat showing the muscles (meat). The final product is a boneless loin back rib 24 that mimics a slab of pork rib meat. The completed process creates six boneless meat cuts 24 that mimic a slab of pork rib meat that are each approximately about four inches to about five inches wide, about 11 inches to about 13 inches long, about ½ inch to about ¾ inch thick and weigh approximately 1.5 pounds to approximately 2 pounds. However, alternate length, width, thickness and weight measurements may be used.

The boneless loin back rib 24 can then be immediately cooked or vacuum packed either dry or with a marinade. Alternatively, the boneless loin back rib 24 can be further processed as desired (e.g., frozen, seasoned, cooked, smoked etc.) to create a final servable food product. The further processed boneless loin back rib 24 can be sold as a raw cut or as a pre-cooked cut that is vacuumed packed either dry or with a marinade.

Although the present invention has been described with reference to preferred embodiments, workers skilled in the art will recognize that changes may be made in form and detail without departing from the spirit and scope of the invention.

The invention claimed is:

1. A method for forming a meat cut from a center cut boneless pork loin that includes only a Longissimus muscle and a Spinalis muscle, the method comprising:
    injecting the boneless pork loin with a seasoning solution;
    tumbling the boneless pork loin;
    sealing the boneless pork loin within a hermetic enclosure;
    chilling the enclosed boneless pork loin to a temperature less than 25 degrees Fahrenheit;
    removing the chilled boneless pork loin from the hermetic enclosure;
    forming the chilled boneless pork loin into a desired shape; and
    cutting the chilled and formed boneless pork loin into a thickness and a length to mimic a slab of pork rib meat.

2. The method of claim 1 wherein the seasoning solution comprises phosphate, spices, flavorings and sodium lactate.

3. The method of claim 1 wherein the sealing step comprises wrapping the boneless pork loin in a vacuum package.

4. The method of claim 1 wherein the boneless pork loin is chilled to a temperature of about 20 degrees Fahrenheit.

5. The method of claim 1 wherein the forming step comprises engaging the chilled boneless pork loin with a press mold.

6. The method of claim 5 wherein the press mold forms the chilled boneless pork loin into a rectangular shape.

7. The method of claim 1 wherein the cutting step comprises cutting the chilled and formed boneless pork loin to produce an 11 to 13 inch length slab of boneless pork meat.

8. The method of claim 1 wherein the cutting step comprises cutting the chilled and formed boneless pork loin to produce a ½ to ¾ inch thick slab of boneless pork meat.

9. The method of claim 1 wherein the cutting step comprises cutting the chilled and formed boneless pork loin to produce a 4 to 5 inch wide slab of boneless pork meat.

10. The method of claim 1 wherein the cutting step comprises cutting the chilled and formed boneless pork loin to produce a 1½ to 2 pound slab of boneless pork meat.

11. A meat product formed in accordance with the method of claim 1.

12. The method of claim 1 further comprising:
applying flavoring materials to one or more surfaces of the slab of pork rib meat;
cooking the flavored slab of pork rib meat; and
sealing the flavored and cooked slab of pork rib meat within a hermetic packaging enclosure.

13. A method for forming a meat cut from a center cut boneless pork loin that includes only a Longissimus muscle and a Spinalis muscle, the method comprising:
injecting the boneless pork loin with a seasoning solution;
tumbling the boneless pork loin;
sealing the boneless pork loin within a hermetic enclosure;
chilling the enclosed boneless pork loin to a temperature less than 25 degrees Fahrenheit;
removing the chilled boneless pork loin from the enclosure;
forming the chilled boneless pork loin into a desired shape; and
cutting the chilled and formed boneless pork loin to ½ to ¾ of an inch thick, 11 to 13 inches long and 4 to 5 inches wide to mimic a slab of pork rib meat.

14. The method of claim 13 wherein the boneless pork loin is chilled to a temperature of about 20 degrees Fahrenheit.

15. The method of claim 13 wherein the forming step comprises engaging the chilled boneless pork loin with a press mold.

16. The method of claim 15 wherein the press mold forms the chilled boneless pork loin into a rectangular shape.

17. The method of claim 13 further comprising:
applying flavoring materials to one or more surfaces of the slab of pork rib meat; and
cooking the flavored slab of pork rib meat.

18. A meat product formed in accordance with the method of claim 13.

* * * * *